UNITED STATES PATENT OFFICE.

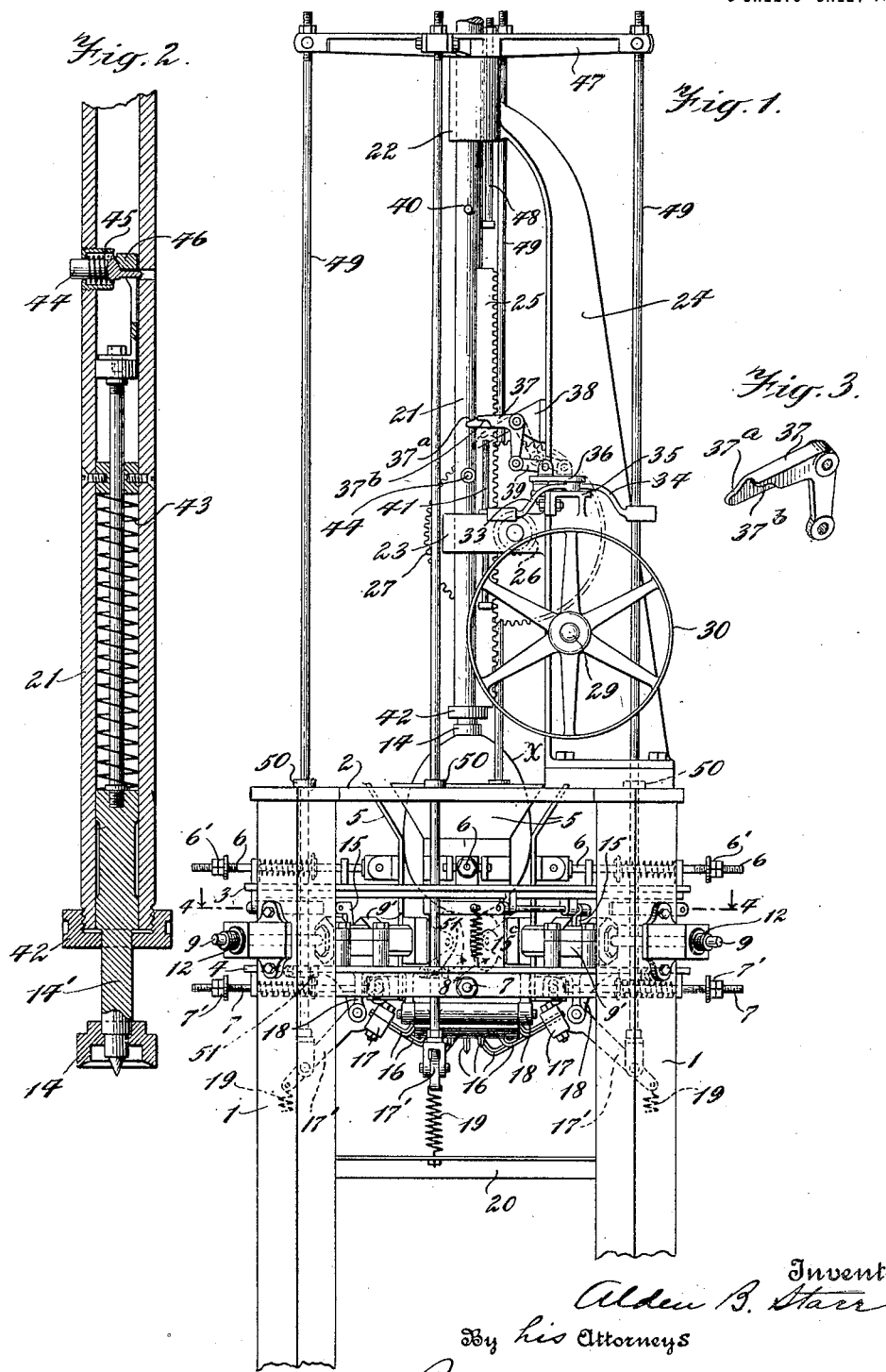

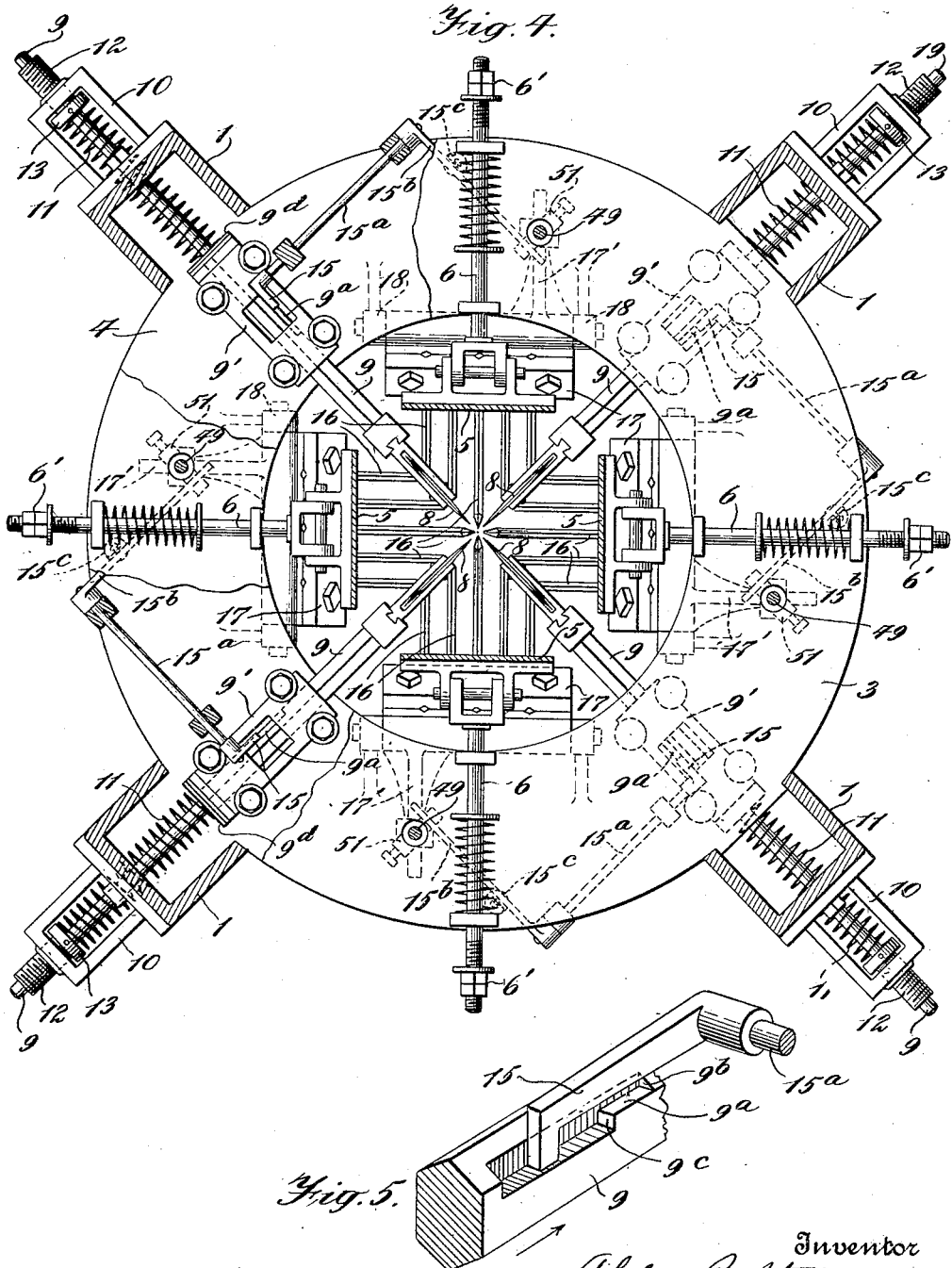

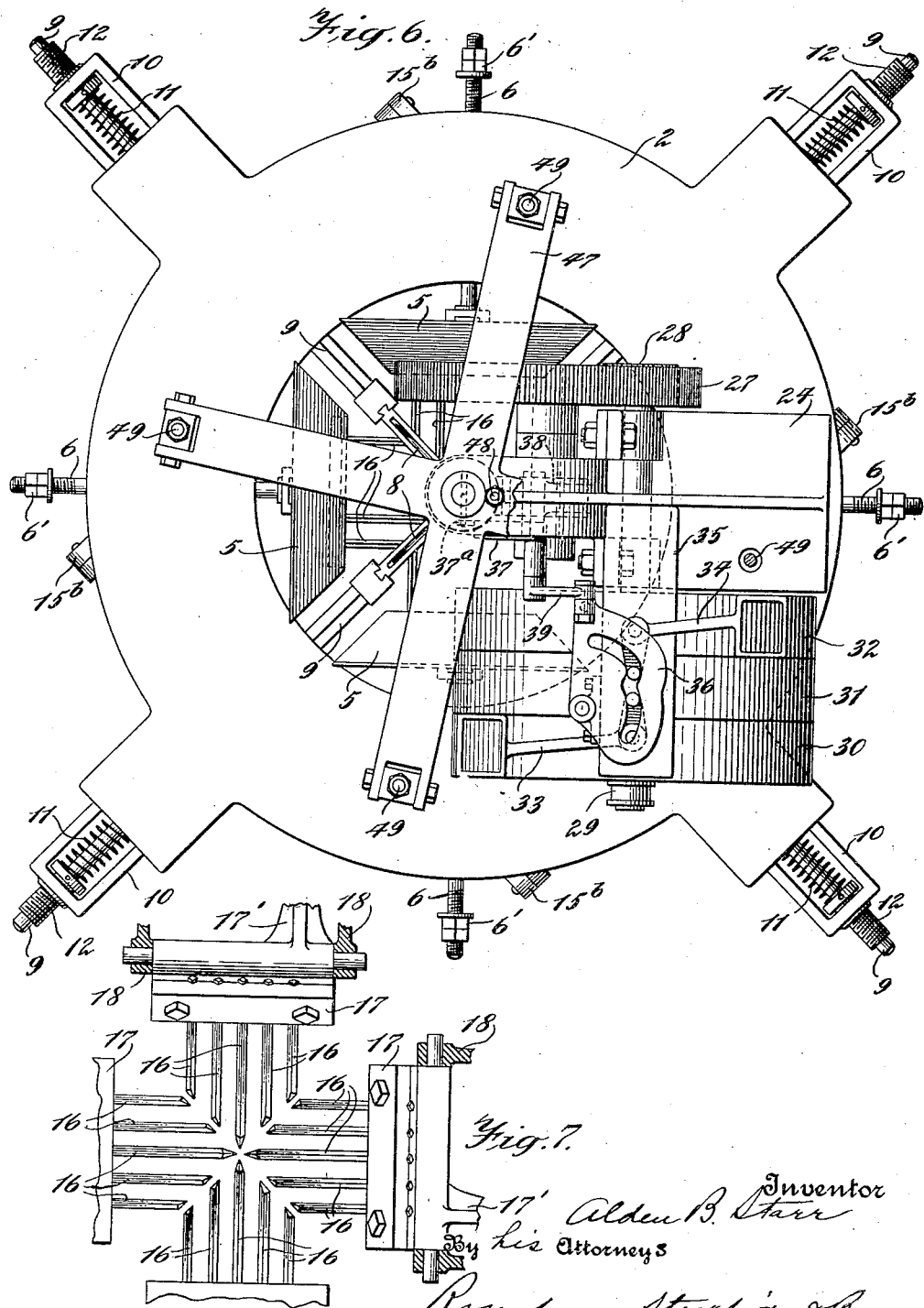

ALDEN B. STARR, OF BROOKLYN, NEW YORK.

COCOANUT-HUSKING MACHINE.

1,319,810.   Specification of Letters Patent.   Patented Oct. 28, 1919.

Application filed October 12, 1916. Serial No. 125,171.

*To all whom it may concern:*

Be it known that I, ALDEN B. STARR, a citizen of the United States, residing at the city of New York, in the borough of Brooklyn and State of New York, have invented certain new and useful Improvements in Cocoanut-Husking Machines, of which the following is a full, clear, and exact description.

My invention relates to machines for removing the husks from cocoanuts, and an object of my invention is to provide a machine for this purpose which will be reliable in its operation. Other objects are simplicity and inexpensiveness of construction, and convenience in operating. Still other objects and advantages of my invention will appear from the following description.

In accordance with my invention, I provide automatic means for first slitting the husk and then stripping it off from the nut. The slitting means comprise one or more knives which are caused to engage the nut for the purpose, and the stripping means comprise members which are inserted within the slit or slits and are caused to spread apart, thereby tearing off the husk. In the preferred form, the nut passes through the machine, being propelled through by a plunger, and in its travel engages first the knives and then the stripping members. Comprehended within my invention are also means for preventing the plunger from being cut by the knives on its return movement, automatic means operated by the plunger on its return for releasing the nut and husks from the stripping members, and means for automatically reversing the plunger before it reaches the knives in the event that no nut is fed to the machine. My invention also includes various other features of construction and arrangements and combinations of parts as will hereinafter more fully appear.

I shall now describe the illustrated embodiment of my invention and shall thereafter point out my invention in claims.

Figure 1 is a side elevation of a complete machine embodying my invention;

Fig. 2 is an enlarged sectional detail of the plunger mechanism;

Fig. 3 is an enlarged detail in perspective of the operating lever for the reversing mechanism;

Fig. 4 is an enlarged horizontal section on the line 4—4 of Fig. 1, with parts broken away;

Fig. 5 is a perspective of a fragment of a slidable knife-carrying bar and of the cooperating latch;

Fig. 6 is a plan of the machine, a portion being broken away; and

Fig. 7 is an enlarged detail in plan of a portion of the stripping mechanism.

In the illustrated embodiment of my invention, one unhusked cocoanut is fed to the machine at a time, being placed in the basket or hopper substantially in the position indicated by the nut X. The framework of the machine consists of four legs 1 and three annular plates 2, 3 and 4, arranged one above the other and spaced apart as shown. The basket or hopper consists of four side plates 5, the tops of which are made flaring. These side plates of the hopper are yieldably mounted by virtue of which the hopper is expansible so as to accommodate nuts of various size, and to this end each side plate is pivotally attached near its top to a longitudinally slidable bar 6, and near its bottom to a longitudinally slidable bar 7, the lower pivotal connection having an elongated opening or slot for the pivot pin, as shown, in order to permit of independent pivotal movement of the top and bottom of the side piece. These longitudinally slidable bars 6 and 7 are arranged substantially centrally between the respective legs 1, the upper bar 6 sliding in suitable bearing lugs on the plate 3, and the lower bar 7 bearing at its outer end in a hole in a depending flange on the plate 4 and at its inner end in a suitable lug (not shown) on the underside of the plate 4. These slidable hopper-supporting bars 6 and 7 are spring pressed inwardly, as shown, suitable adjustable stops 6' and 7' being provided to limit the extent of inward movement.

Arranged radially within the hopper are four rotatably mounted husk-slitting knives 8, these knives radiating about substantially the axial line of the hopper. These knives are carried upon the inner ends of horizontal longitudinally slidable bars 9, the knife holders being removably connected to the bars, in the form shown, having a dovetail connection with heads thereon. These bars 9 enter the hopper diagonally, or through the corners thereof, the side pieces 5 of the hopper being spaced and cut away to receive the bars. Guide blocks 9' for the knife-supporting slidable bars 9 are secured to the lower annular plate 4, and the continuation of each slidable bar, which is shown as reduced and rounded, extends through the respective leg 1 and the hollow block 10 on the outer side of the leg, a coiled spring 11 resiliently holding the slidable bar in its innermost position. The tension of the spring 11 is adjusted by turning an externally screw-threaded sleeve 12 which engages internal threads in the opening of the block 10, thereby adjusting the abutment collar 13 of the spring.

The cocoanut is forced down between these yieldably mounted knives by a vertically reciprocative plunger head 14, which is reciprocated by means hereinafter described. The knives yield outwardly against the tension of the springs 11 as the cocoanut is forced between them, and in order to prevent the knives from closing upon the plunger head 14, means are provided for holding the knives in their retracted positions until the plunger head has been withdrawn. For this purpose each bar 9 is provided with a latch-engaging groove 9ª (see Fig. 5) upon the portion which slides within the block 9', the block 9' being cut away on its top to expose the grooved portion of the bar 9, as shown in Figs. 1 and 4. A pivoted latch finger 15 is arranged to rest in this groove, the rotative latch shaft 15ª bearing in lugs on the underside of the plate 3, and being provided on its end opposite the latch 15 with a trip arm 15ᵇ extending in the proper direction and a spring 15ᶜ attached thereto to hold the latch 15 depressed. The groove 9ª is made with a step, as shown in Fig. 5, the higher portion being at the outer end of the groove and preferably somewhat shorter than the lower portion. At the beginning of the operation, the latch finger 15 is on the upper level of the groove 9ª bearing against the shoulder 9ᵇ and thereby limiting the inward movement of the knives. When the knives are forced apart by the insertion of the cocoanut, the bar 9 moves outwardly in the direction indicated by the arrow in Fig. 5 and the latch finger 15 falls down to the lower level, which is the position indicated in Fig. 5, and permits the bar 9 to be moved outwardly until the latch finger engages the inner end of the groove, the groove being of sufficient length to permit of the insertion of the largest sized cocoanuts. When the cocoanut is passed between the knives, the bar 9 is returned by the spring 11 until the latch finger 15 engages the shoulder 9ᶜ, and the bar is held in this retracted position until means, which will hereinafter be described, are operated to raise the latch finger 15 and permit the bar 9 to continue its inward movement until the latch finger 15 again engages the shoulder 9ᵇ. Preferably also a positive stop will be used to limit the inward movement of the bar, and such a stop is shown in Fig. 4 as a plate 9ᵈ on each bar 9 which strikes against a cushion on the outer end of the block 9'. This stop is omitted in Fig. 1 for the sake of clearness of illustration.

The husk-stripping mechanism is located below the knives and is next engaged by the cocoanut. In the form shown, the stripping mechanism consists of four sets of L-shaped fingers 16, each set being carried by a block 17 which is pivotally mounted on brackets 18 depending from the underside of the annular plate 4. The four blocks 17 are arranged in the form of a square and the fingers 16 are so proportioned in length that the inner upturned ends meet in four diagonal lines underneath, and in plane of, the respective knives 8, as appears in Fig. 4, the fingers being shown slightly open in Figs. 4 and 5 for the purpose of better illustrating their shape. The fingers 16 are square in cross section and their inner ends are sharpened and flattened in order to enter the slits in the husk made by the knives 8. Each pivoted block 17 has an integral downwardly inclined arm 17', and coiled springs 19 connect the outer end of these arms to cross bars 20 of the frame and tend to hold the fingers 16 in their innermost rotative position.

It will now be seen that after the cocoanut has been forced by the plunger between the knives 8 and the husk thereby slitted, it next engages the husk-stripping fingers 16, the four upstanding pairs of sharpened ends entering in the respective slits. The continued downward movement of the plunger rotates the four sets of fingers upon their pivots against the tension of the springs 19, causing the fingers to separate from the position shown in Fig. 1 and tear the husk loose from the nut.

The plunger may be reciprocated by any suitable means. In the construction shown, a rack and pinion are employed for this purpose. The shaft 21 of the plunger is guided in the two bearings 22 and 23 on a bracket arm 24 secured to the top plate 2. A rack 25 is fastened to the plunger shaft longitudinally thereof, being preferably integral therewith. A pinion 26 engages this rack and is mounted on a stud with a gear wheel 27 which in turn is engaged by a pinion 28 on the power shaft 29. In the construction shown, power is applied by means of a belt and pulley. Three belt wheels 30, 31 and 32 are mounted upon the power shaft 29, the belt wheels 30 and 32 being idlers, and the belt wheel 31 being fixed to the power shaft. Two belts from a countershaft are employed in the usual way, one being given a twist in order that they may impart rotation to the power shaft in opposite directions.

The movement of the plunger is reversed by a reversing mechanism consisting of a belt shifter of usual construction. Two shifting arms 33 and 34 are pivoted to a plate or arm 35 outstanding from the bracket 24, the belts passing through the respective belt shifters, and these belt shifters are operated by the rotation of a pivoted cam plate 36 having arcuate grooves of the proper shape which are engaged by rollers on crank arms of the belt shifters. As the cam plate 36 is rotated in one direction, the belt shifter 34 swings its belt off the pulley 31 and the belt shifter 33 swings its belt on the pulley 31, and when the cam plate is rotated in the opposite direction, the movement of the belt shifters is reversed. It will be noted that for an instant both belts will be upon the fixed pulley 31, one moving off and the other moving on, resulting in a braking effect upon the plunger at the end of its throw in each direction.

The cam plate 36 is operated by an operating lever 37 which is engaged and actuated by suitable abutments upon the plunger shaft 21. The operating lever 37 is one arm of a bell crank which is pivoted to a projection 38 on the bracket 24, the other end of the bell crank being operatively connected with the cam plate 36 by means of a link 39. The cam plate 36 is thus actuated by the lever 37.

When the operating lever 37 is in the position shown in full lines in Fig. 1, the plunger is traveling downwardly. A pin 40 is provided on the plunger shaft 21 in the proper position to strike the operating lever 37 and move it to the dotted position of Fig. 1, and reverse the plunger just at the limit of its downward movement, a groove being provided in the upper bearing 22 to accommodate the pin. The operating lever 37 is raised again by a pin 41 which is vertically slidable in the lower bearing 23, being engaged by a collar 42 on the lower end of the plunger shaft just prior to the end of the upward movement of the plunger.

With the parts in the position shown in Fig. 1, the plunger is on its downward movement a short distance from the top. The plunger will continue to descend until the pin 40 strikes the lever 37 and moves it down to the dotted position, the end of the lever 37 being curved, as shown at 37ª so as to permit the pin to ride over and clear the end. The belts are then shifted and the plunger is reversed, the pin 40 clearing the lever 37 on its return movement. Just prior to reaching the top of the stroke, the plunger reverses the lever 34, which is effected by the collar 42 which strikes the pin 41 and raises it, the pin striking the lever 37 underneath the curved portion 37ᵇ which is formed on the full width portion of the lever, the outer end being preferably made thin, as shown.

Automatic reversing means for the plunger are provided which operate in case no cocoanut is fed to the machine. The plunger stem 14' of the plunger head 14 telescopes within the shaft 21 which is made hollow for the purpose (see Fig. 2), the outward movement of the stem being limited by the shoulder which strikes the collar 42 in the manner shown. A coiled spring 43 holds the plunger head and stem in its outermost position. A trigger or lug 44 is adapted to protrude through an opening in the shaft and a coiled spring 45 tends to withdraw the same. A cam block 46 on the upper end of the plunger stem operates to hold the trigger 44 in protruding position so long as the spring 43 is expanded. When the plunger engages the cocoanut, the spring 43 is compressed, the plunger stem moving upwardly within the shaft 21, and the trigger 44 is thereby released and is withdrawn by the spring 45. It will therefore be seen that in the normal operation of the machine, the trigger 44 is inoperative, but when there is a failure to feed the cocoanut, the trigger 44 serves to reverse the plunger after a short part of its downward travel and the plunger head is thus prevented from coming in contact with the knives 8.

Means are also provided for releasing the latches 15 and for giving an additional rotative movement to the fingers 16 in order to release the husk and the cocoanut, just at the end of the upward movement of the plunger. For this purpose a four-armed yoke 47 is provided above the upper bearing 22. This yoke has a hub portion which slides freely over the plunger shaft 21, and a bolt or pin 48 depends therefrom through a slot in the upper bearing 22 in the path of the rack 25. The outer ends of the arms of the yoke 47 are connected by rods 49 to the outer ends of the arms 17' of the stripping mechanism. Suitable means are provided for limiting the inward rotative movement of the fingers 16 under the influence of the springs 19, at the point at which the fingers just meet. These means are shown as collars 50 on the rods 49 which are so located as to strike the top of the plate 2 just as the ends of the stripping fingers meet. These rods also carry tripping fingers 51 which are so positioned upon the rods that they just reach the respective tripping arms 15ᵇ of the latches as the plunger reaches the limit of its downward movement and the fingers 16 have rotated outwardly through their stripping operation. It is manifest that this rotative movement of the fingers 16 serves to elevate the rods 49, but since these rods slide freely through blocks pivotally mounted in the ends of the arms of the yoke 47, the yoke remains resting on the top of the bearing 22 until the plunger approaches the end of its upward movement. At this point the pin 48 is engaged by the top of the rack 25, and the yoke is lifted thereby until it engages the nuts on the ends of the rods 49, after which the upward movement is continued for a short distance and the rods 49 carried up thereby, releasing the latches 15 and opening the fingers 16 beyond the position then occupied, sufficiently to allow the husk and cocoanut to drop therethrough. On the return movement of the plunger, the stripping fingers are again closed by the springs 19.

While the machine is especially adapted for the purpose described, other uses not herein specifically referred to will occur to one skilled in the art; and it is obvious that various modifications may be made in the construction shown in the drawings and above particularly described within the principle and scope of my invention.

I claim:

1. A cocoanut husking machine comprising a guide for the cocoanuts and means for impelling the cocoanuts therethrough, a knife for slitting the husk of a cocoanut as it passes through said guide, and two pivoted stripping members so arranged that they meet in position for their meeting edges to enter the slit as the cocoanut passes the knife and separate as the stripping members are rotated about their pivots by the movement of the cocoanut.

2. A cocoanut husking machine comprising a guide for the cocoanuts and means for impelling the cocoanuts therethrough, a knife for slitting the husk of a cocoanut as it passes through said guide, two pivoted stripping members each including a hub portion and stripping fingers mounted thereon having their inner ends sharpened and bent toward the knife, the fingers of the two members being so arranged that in the innermost rotative position of the hubs their inner ends meet in a line in the plane of the knife and are separated when rotated outwardly by the movement of the cocoanut, and means for resiliently holding the hubs in their innermost rotative positions.

3. A cocoanut husking machine comprising a hopper having yieldable sides, whereby the capacity of the hopper is variable, a plurality of yieldably mounted knives in the hopper radiating about substantially the axial line thereof, and a corresponding number of pivoted stripping members having their inner edges turned toward the knives, the stripping members being so arranged that their inner edges meet in radiating lines in the planes of the respective knives, whereby each pair of meeting edges is adapted to enter the slit made by the corresponding knife.

4. A cocoanut husking machine comprising a hopper and means for impelling the cocoanuts therethrough, a plurality of longitudinally movable knife-supporting bars entering the hopper laterally thereof, resilient means tending to hold the bars to their innermost positions, a rotary knife on the inner end of each bar, a plurality of pivoted stripping members corresponding in number to that of the knives, each stripping member including a hub portion and stripping fingers mounted thereon having their inner ends sharpened and bent toward the knives, the fingers of the stripping members being so arranged that in the innermost rotative position of the hubs their inner ends meet in radiating lines in the planes of the respective knives and are separated when rotated outwardly by the movement of the cocoanut, and means for resiliently holding the hubs in their innermost rotative positions.

5. A cocoanut husking machine comprising a plurality of knives arranged radially and movable in their respective planes toward and away from each other, means for resiliently holding the knives in their position of closest approach, a plunger for impelling a cocoanut between the knives, and locking members operative to lock the knives in retracted position, whereby the plunger is free to return between the knives.

6. A cocoanut husking machine comprising a plurality of knives arranged radially and movable in their respective planes toward and away from each other, means for resiliently holding the knives in their position of closest approach, a plunger for impelling a cocoanut between the knives, locking members operative to lock the knives in retracted position, whereby the plunger is free to return between the knives, and releasing means for the locking members operated by the return movement of the plunger.

7. A cocoanut husking machine comprising a plurality of knives arranged radially and movable in their respective planes toward and away from each other, means for resiliently holding the knives in their position of closest approach, a plunger for impelling a cocoanut between the knives, locking members operative to lock the knives in retracted position, whereby the plunger is free to return between the knives, pivoted husk stripping members positioned to enter the slits in the husk and operative to strip the husk from the nut when rotated upon their pivots by the movement of the nut, and releasing means for the locking members operated by the return movement of the plunger.

8. A cocoanut husking machine comprising a plurality of radiating longitudinally slidable knife-supporting bars and husk-slitting knives on the inner ends thereof, each bar being provided with a latch-engaging portion, resilient means for holding the bars in their positions of nearest approach, a plunger operative to impel a cocoanut between the knives, thereby separating the knives against the tension of the resilient means, and a latch for each bar arranged to catch the latch-engaging portion thereof and hold the bar in its retracted position, whereby the plunger is free to return between the knives.

9. A cocoanut husking machine comprising a plurality of radiating longitudinally slidable knife-supporting bars and husk-slitting knives on the inner ends thereof, each bar being provided with a latch engaging portion, resilient means for holding the bars in their positions of nearest approach, a plunger operative to impel a cocoanut between the knives, thereby separating the knives against the tension of the resilient means, a latch for each bar arranged to catch the latch-engaging portion thereof and hold the bar in its retracted position, whereby the plunger is free to return between the knives, pivoted husk-stripping members positioned to enter the slits in the husk and operative to strip the husk from the nut when rotated upon their pivots by the movement of the nut, and releasing means for the latches operated by the return movement of the plunger.

10. A cocoanut husking machine comprising a plurality of radiating longitudinally slidable knife-supporting bars and husk-slitting knives on the inner ends thereof, each bar being provided with a latch-engaging portion, resilient means for holding the bars in their positions of nearest approach, a plunger operative to impel a cocoanut between the knives, thereby separating the knives against the tension of the resilient means, a latch for each bar arranged to catch the latch-engaging portion thereof and hold the bar in its retracted position, whereby the plunger is free to return between the knives, pivoted husk-stripping members positioned to enter the slits in the husk and operative to strip the husk from the nut when rotated upon their pivots by the movement of the nut, and means operated by the return movement of the plunger for releasing the latches and imparting an additional rotative movement to the husk-stripping members to release the cocoanut.

11. A cocoanut husking machine comprising a plurality of radiating longitudinally slidable knife-supporting bars and husk-slitting knives on the inner ends thereof, each bar being provided with a latch-engaging portion, resilient means for holding the bars in their positions of nearest approach, a plunger operative to impel a cocoanut between the knives, thereby separating the knives against the tension of the resilient means, a latch for each bar arranged to catch the latch-engaging portion thereof and hold the bar in its retracted position, whereby the plunger is free to return between the knives, pivoted husk-stripping members positioned to enter the slits in the husk and operative to strip the husk from the nut when rotated upon their pivots by the movement of the nut, a movable abutment behind and in the path of the plunger, connecting members between the abutment and the outer ends of the the husk-stripping members, and latch releasing projections on the connecting members, whereby when the plunger engages and moves the abutment on its return movement, the latches are released and the husk-stripping-members further rotated to release the cocoanut.

12. A cocoanut husking machine comprising a guide for the cocoanuts and a reciprocative plunger for impelling the cocoanuts therethrough, a knife for slitting the husk of a cocoanut as it passes through said guide, two pivoted stripping members so arranged that they meet in position for their meeting edges to enter the slit as the cocoanut passes the knife and separate as the stripping members are rotated about their pivots by the movement of the cocoanut, and connection between the stripping members and the plunger operative to impart an additional rotative movement to the stripping members during the return movement of the plunger.

13. In a machine of the class described, a reciprocative plunger and shaft therefor, a reversing device including an operating lever adjacent the plunger, a trigger carried by the plunger and adapted to protrude and engage the lever, and means operated by back pressure on the plunger for withdrawing the trigger.

14. In a machine of the class described, in combination with a reversing device including an operating lever, a hollow reciprocative plunger shaft, a plunger head and stem therefor extending into the shaft and including a stop limiting the outward movement thereof, resilient means tending to hold the stem to outermost position, a trigger carried by the shaft and adapted to protrude in position to strike the operating lever, and means operated by the inward movement of the plunger stem for withdrawing the trigger.

In witness whereof I subscribe my signature.

ALDEN B. STARR.

Copies of this patent may be obtained for five cents each, by addressing the "Commissioner of Patents, Washington, D. C."